Sept. 1, 1959  J. H. WILLWERTH  2,902,185
DISTRIBUTOR COVER
Filed Dec. 3, 1956

INVENTOR.
JOHN H. WILLWERTH
BY
ATTORNEY

//united States Patent Office 2,902,185
Patented Sept. 1, 1959

2,902,185

DISTRIBUTOR COVER

John H. Willwerth, Ephrata, Pa., assignor to Sperry Rand Corporation, New Holland, Pa., a corporation of Delaware Application December 3, 1956, Serial No. 625,786

6 Claims. (Cl. 220—31)

This invention relates to improvements in a distributor cover and, more particularly, to a cover for an agricultural distributor used to dispense or discharge various types of pulverulent material such as lime, fertilizer, or seeds in accordance with conventional practice. Such distributors normally are provided with an elongated hopper supported by wheels respectively mounted at opposite ends thereof and agitating means usually are provided in the lower portion of the hopper adjacent the discharge ports therein.

The top of the elongated hopper may be uninterrupted from one end to the other thereof or, as is rather conventional in modern distributors of this type of substantial length, said elongated hopper may be divided into more than one compartment. The material to be distributed is introduced into the hopper through the open top thereof and it is desirable that said top be closed with a suitable cover, there being either a unitary cover for the entire open top of an uninterrupted hopper or a separate top for each compartment of the hopper if a plurality of compartments are provided.

It is necessary that the tops for hoppers of this nature fit the hopper tightly, particularly in order that rain or other atmospheric moisture may not enter the hopper. This is particularly desirable when lime and fertilizer, for example, are being distributed inasmuch as moisture tends to cake this type of material and also, when moist, material of this type tends to rust and otherwise corrode the interior of the hopper and the agitating mechanism therein.

Further, agricultural distributors of this type normally are propelled over the ground by power means such as a tractor or by one or more horses which pull the distributor behind them, whereby loading of the hopper easily is accomplished from the rear thereof. The distributor being pulled however also may have another implement such as a harrow hitched rearwardly thereof and, under these circumstances, it would be more convenient to load the hopper from the front thereof even though the draft mechanism of the distributor extends forwardly from the hopper and offers a slight obstruction to filling the hopper from the front.

In order to facilitate the loading of the distributor, it is conventional that the covers for the hopper be hinged to the longitudinal upper edge of the hopper which is nearest the draft mechanism for the distributor in order that the distributor might be filled from the back thereof, whereby the draft mechanism will not interfere with such filling operation. However, when a harrow or the like is hitched to the rear of the distributor, this offers more obstruction than the draft mechanism and, to meet such conditions, it is desirable that the hinged covers have reversable hinging mechanism so as selectively to permit hingedly connecting the covers to the longitudinal edge of the hopper which is opposite the edge from which filling is to take place.

Latching means for the covers also are provided so as to hold the covers tightly closed upon the hopper and it also is customary to provide a suitable shield means for the hinge mechanism which is operable when the cover is raised to open position, to direct the material being dumped into the hopper and away from the hinge mechanism in order that it may not be wasted by sifting therethrough, for example, and otherwise to facilitate the filling of the hopper.

The provision of these desired essentials heretofore has rendered the inclusion of reversible hinge and latching means somewhat complicated and, to a large extent, duplicate hinging elements are required on opposite sides of the hopper. Further, the disconnection of the hinge elements so as to reverse the pivotal mounting of the cover upon the hopper has resulted in structures which are either relatively complex in nature or the operation thereof is cumbersome.

It is the principal object of the present invention to provide a cover for agricultural distributors of the type referred to with extremely simple means which preferably are fixed relative to the cover and serve the multiple function of holding the cover tightly against the hopper when said cover is closed, limiting the pivotal movement of the cover to open position when the hopper is being filled, guiding the material into the hopper without spilling when the cover is open and particularly deflecting the material away from the hinge mechanism, and also permitting ready removal of the cover from the hopper and reversing the same without requiring any additional hinge elements or any awkward movement of the cover relative to the hopper.

Details of the foregoing objectives and of the invention, as well as other objects thereof are set forth in the following specification and illustrated in the accompanying drawing comprising a part thereof.

Figure 1:
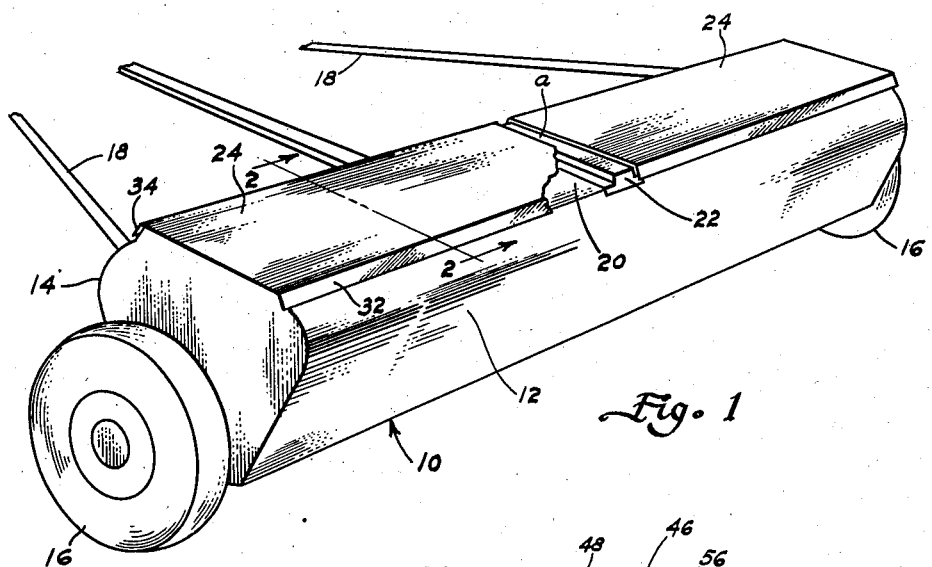
Fig. 1 is a perspective view showing an exemplary agricultural distributor having a hopper and cover embodying the principles of the present invention, part of the draft mechanism for the distributor being broken away to accommodate the figure to the drawing and a portion of one of the covers being broken away to illustrate details of the top of the hopper.

The exemplary agricultural distributor selected to illustrate the principles of the present invention, as shown in Fig. 1, comprises a hopper 10 having opposite sides 12 and 14. Wheels 16 are rotatably connected to opposite ends of the hopper 10 and suitable draft mechanism 18 is connected by suitable means, not shown, so as to extend forwardly from side 14 for example of the hopper 10.

The hopper 10 is provided with an elongated top filling opening 20 which, in the specific arrangement illustrated herein, is divided intermediately of its ends by a crosspiece 22 which extends between the upper edges of the sides 12 and 14. Inasmuch as the filling opening 20 is divided in two, a plurality of similar covers or lids 24 are arranged respectively to cover the two sections of the filling opening 20. It is to be understood however that if no dividing means such as cross-piece 22 are used, and the filling opening 20 is unbroken from end to end, then a single cover 24 will be used.

The upper edges of the sides 12 and 14 terminate in inwardly and downwardly extending flanges 26 and 28 which extend longitudinally along said upper edges and define respectively opposite sides of the filling opening 20. The terminal edges of flanges 26 and 28 also project inwardly of said hopper as clearly shown in Figs. 2 through 4. The upper portions of the sides 12 and 14 also are shaped to provide longitudinally extending grooves 30 and 31 respectively formed in said sides. Said grooves comprise fulcrum seats to be described hereinafter.

Each of the covers 24 are both wider and longer than the filling opening in the hopper which they cover. Preferably, the longitudinal side edges of each cover 24 terminate in flanges 32 and 34 which extend downwardly and somewhat outwardly as clearly shown in Figs. 2 through 4 for purposes of shielding the interior of hopper 10 against the entrance of rain and other atmospheric moisture, and the outermost extremity of flange 34 also acts as a fulcrum for the cover during pivotal movement thereof relative to the hopper 10, said fulcrum being disposed selectively either in the groove 28 or 30, depending upon whether the cover is being hingedly supported by the upper end of side 12 or 14. Such fulcruming arrangement is illustrated in Fig. 3.

An elongated movement-controlling or securing member 36 also extends longtudinally along one side of the cover 24, one edge portion 38 of said member being connected to the inner surface of cover 24, by welding, riveting, or any other suitable means, and an intermediate portion 40 of said member extends at an acute angle to the inner surface of cover 24 and is connected to an arcuate portion 42 of said member which is curved about the terminal edge of flange 34 which comprises approximately the center of the arc, the outer edge of member 36 terminating in an inwardly directed flange 44. The extreme outer edge of flange 44 is parallel to and spaced from the extreme outer edge of flange 34. Preferably, member 36 is substantially co-extensive in length with that of cover 24.

Figure 2:
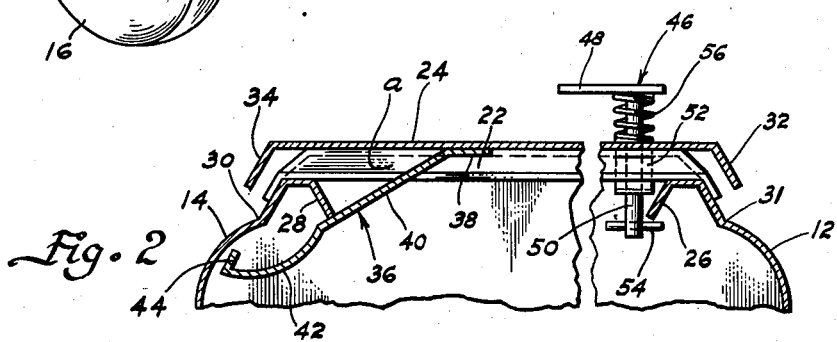
Fig. 2 is a fragmentary vertical cross-sectional view taken on the line 2—2 of Fig. 1 and illustrating on a larger scale than in Fig. 1 details of the mechanism comprising the principal feature of the invention which serves to connect the cover reversably to the hopper of the distributor.
Figure 3:
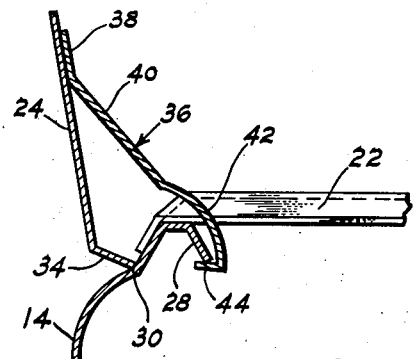
Fig. 3 is a view similar to Fig. 2 but showing the fragmentarily illustrated cover in fully opened position relative to a fragmentarily illustrated portion of the hopper of the distributor.
Figure 4:
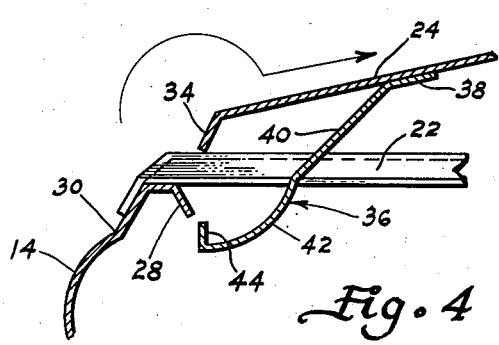
Fig. 4 is a view similar to Figs. 2 and 3 but showing the cover arranged in slightly opened position and moved partly in separating direction to effect disconnection of the cover from one edge of the hopper preparatory to reversing the same and pivotally connecting the cover to the opposite edge thereof.

Member 36 comprises the most essential feature of the entire structure in accordance with the invention and serves the multiple function of deflecting and directing material with which the hopper is being filled into the filling opening 20, especially in the event such material contacts the inner surface of cover 24 while the hopper is being filled; limiting the opening movement of cover 24 by the action of fulcrum 34 when disposed for example in groove 30 due to the engagement of inwardly directed flange 44 with the terminal end of flange 28 as shown in Fig. 3; holding the longitudinal side edge of cover 24 adjacent flange 34 in tightly closed relationship with the upper edge of side 14 due to the engagement of intermediate portion 40 of member 36 with the inwardly projecting terminal edge of flange 28, as shown in Fig. 2 when the covers or lids 24 are moved slidably within the plane of the top opening of the hopper; and permitting the ready removal of cover 24 from the upper edge of the side of the hopper to which it is pivotally connected by slightly raising the opposite side of said cover from said hopper and slidably removing the cover in the direction of the arrow shown in Fig. 4, it being understood of course that the connecting of the cover with one or the other upper edges of the sides of the hopper is effected by arranging the cover relative to the hopper in a similar position and then slidably moving the cover in a direction reverse to that of the arrow shown in Fig. 4.

The space between the terminal edges of flanges 34 and 44, as is clearly shown in Fig. 4, is adequate to accommodate therebetween the flange 28 at the upper edge of side 14 or flange 26 at the upper edge of side 12 when the hinging of the cover takes place relative to side 12. Such disengaging or engagement movement of the cover relative to the selected side is effected easily by sliding the opposite ends of flange 34 of the cover 24 respectively along the opposite ends of the hopper 10 or along one of said ends and the cross-piece 22, the latter being illustrated in Figs. 2 through 4, Fig. 4 particularly illustrating such sliding movement.

To complete the latching of the cover 24 to the upper edges of sides 12 and 14, the cover 24 also is provided with a preferably spring-urged latch mechanism 46 comprising an operating handle 48 on the exterior of the cover, a rotatable shaft 50 extending through the cover and supported by a bearing bracket 52, a keeper 54 which is secured to the lower end of shaft 50 and is engageable with the terminal edge of flange 26 or 28, depending upon how the cover is disposed relative to the hopper 10, and a spring 56 which operates for example between the handle 48 and the upper surface of cover 24 so as constantly to urge the side edge of cover 24 adjacent flange 32 into tight engagement with the adjacent upper edge of the side of the hopper when the keeper 54 is in engagement with the terminal edge of flange 26 or 28. By rotating the handle 48, the keeper 54 disengages the terminal edge of flange 26 for example and the adjacent edge of the cover 24 then may be raised to the position shown in Fig. 3 so as to permit filling of the hopper 10. If it is desired to remove the cover to reverse the same or otherwise, the edge of the cover adjacent the latching mechanism 46 is only partially raised, as illustrated in Fig. 4, to permit sliding movement of the cover transversely of the longitudinal axis of hopper 10 until the flange 44 of the movement controlling member 36 clears the flange 28 for example on the upper edge of side 14 of the hopper.

From the foregoing, it will be seen that the cover 24 comprises a unit including a movement controlling member 36 which is rigidly connected thereto and a latch mechanism 46 which is movably supported by the cover. These elements at all times comprise an assembled unit of which the respective elements are not disconnectable from each other and they remain as a unit when the cover is being reversed for pivotal movement relative to the upper edge of one side of the hopper or the other. No hinge elements of any kind have to be duplicated on one side or the other of the hopper in order to effect such selective pivotal movement of the cover relative to the hopper. Also, the movement controlling member 36 serves the quadruple function described in detail above including the deflecting of material into the hopper during the filling operation, the limiting of the opening movement of the cover as shown in Fig. 3, the holding of one longitudinal edge of the cover in tightly closed position as shown in Fig. 2, and permitting the ready attachment of the pivotal edge of the cover selectively to the upper edge of one side or the other of the hopper and disconnection thereof from said upper edge of the hopper simply by slightly elevating the opposite edge of the cover and then moving the same in a direction transverse to the longitudinal axis of the hopper. Said cover unit, as well as the necessary details of the upper edges of the hopper for purposes of employing the invention are inexpensive to manufacture and assemble, are rugged and durable in nature, are fool-proof in operation, and the operation thereof is easily understandable.

While the invention has been described and illustrated in its preferred embodiment, and has included certain details, it should be understood that the invention is not to be limited to the precise details herein illustrated and described since the same may be carried out in other ways falling within the scope of the invention as claimed.

I claim:

1. A cover construction for a distributor for agricultural material comprising in combination, an elongated hopper having a top filling opening extending longitudinally of said hopper, the upper edges of the elongated sides of said hopper defining opposite sides of said opening and terminating in similar inturned elongated flanges extending downwardly into said hopper, a reversible elongated cover slightly longer and wider than said top opening, one elongated edge of said cover comprising a fulcrum for said cover for pivotal movement thereof between open and closed positions, and an elongated securing member connected at one edge to the interior of said cover in spaced parallelism to said one edge thereof and extending at an angle downwardly from said cover and toward said one edge thereof, said securing member terminating at its outer edge in a flange directed toward said one edge of said cover and spaced therefrom sufficiently to permit movement therethrough of one of said flanged longitudinal upper edges of said hopper when the other edge of said cover is raised slightly above said hopper, whereby said cover readily may be attached to or removed from either upper edge of said hopper selectively by moving said cover in a direction away from and transverse to said one edge thereof when said other edge is raised above the top of said hopper, said flange on said securing member being engageable with the downwardly extending flange on the upper edge of the hopper relative to which the cover is pivotally movable when the opposite edge of the cover has moved past the vertical toward open position to limit such opening movement, and a portion of said securing member engaging said downwardly extending flange on the upper edge of said hopper when said cover is closed to prevent upward movement of said cover relative to said hopper.

2. A cover construction for a distributor for agricultural material comprising in combination, an elongated hopper having a top filling opening extending longitudinally of said hopper, the upper edges of the elongated sides of said hopper defining opposite sides of said opening and terminating in similar inturned elongated flanges extending downwardly into said hopper, a reversible elongated cover slightly longer and wider than said top opening, one elongated edge of said cover comprising a fulcrum for said cover for pivotal movement thereof between open and closed positions, an elongated securing member connected at one edge to the interior of said cover in spaced parallelism to said one edge thereof and extending at an angle downwardly from said cover, said securing member terminating at its outer edge in a flange directed toward said one edge of said cover and spaced therefrom sufficiently to permit movement therethrough of one of said flanged longitudinal upper edges of said hopper when the other edge of said cover is raised slightly above said hopper, whereby said cover readily may be attached to or removed from either upper edge of said hopper selectively by moving said cover in a direction away from and transverse to said one edge thereof when said other edge is raised above the top of said hopper, said flange on said securing member being engageable with the downwardly extending flange on the upper edge of the hopper relative to which the cover is pivotally movable when the opposite edge of the cover has moved past the vertical toward open position to limit such opening movement, and a portion of said securing member engaging said downwardly extending flange on the upper edge of said hopper when said cover is closed to prevent upward movement of said cover relative to said hopper, and latch means on said cover adjacent the opposite edge thereof movable into and out of engagement with a portion of the upper edge of the side of the hopper opposite that with which said securing member is in engagement to hold said cover latched to said hopper.

3. A cover construction for a distributor for agricultural material comprising in combination, an elongated hopper having a top filling opening extending longitudinally of said hopper, the upper edges of the elongated sides of said hopper defining opposite sides of said opening and terminating in similar inturned elongated flanges extending downwardly into said hopper, a reversible elongated cover slightly longer and wider than said top opening and the opposite side edges thereof comprising downwardly turned flanges, the terminal edge of one of said flanges comprising a fulcrum for said cover for pivotal movement thereof between open and closed positions when said edge initially is moved into engagement with the exterior of one side of said hopper, and an elongated securing member connected at one edge to the interior of said cover in spaced parallelism to said one edge thereof and including a portion extending at an acute angle toward said one flange on said cover and engageable therewith when said cover is in closed position, said securing member also having an arcuate portion curved about the terminal edge of said one flange and terminating in a stop flange directed toward said one edge of said cover and spaced therefrom sufficiently to permit movement therethrough of one of said flanged longitudinal upper edges of said hopper when the other edge of said cover is raised slightly above said hopper, whereby said cover readily may be attached to or removed from either upper edge of said hopper selectively by moving said cover in a direction away from and transverse to said one edge thereof when said other edge is raised above the top of said hopper, said stop flange on said securing member being engageable with the downwardly extending flange on the upper edge of the hopper relative to which the cover is pivotally movable when the opposite edge of the cover has moved past the vertical toward open position to limit such opening movement, the angularly extending portion on said member being engageable with the terminal edge of said flange on said upper edge of the hopper when said cover is closed to secure said cover against upward movement at the edge to which said member is attached.

4. A cover construction for a distributor for agricultural material comprising in combination, an elongated hopper having a top filling opening extending longitudinally of said hopper, the upper edges of the elongated sides of said hopper defining opposite sides of said opening and terminating in similar inturned elongated flanges extending downwardly into said hopper, a reversible elongated cover slightly longer and wider than said top opening and the opposite side edges thereof comprising downwardly turned flanges, the terminal edge of one of said flanges comprising a fulcrum for said cover for pivotal movement thereof between open and closed positions when said edge initially is moved into engagement with the exterior of one side of said hopper, an elongated securing member connected at one edge to the interior of said cover in spaced parallelism to said one edge thereof and including a portion extending at an acute angle toward said one flange on said cover and engageable therewith when said cover is in closed position, said securing member also having an arcuate portion curved about the terminal edge of said one flange and terminating in a stop flange directed toward said one edge of said cover and spaced therefrom sufficiently to permit movement therethrough of one of said flanged longitudinal upper edges of said hopper when the other edge of said cover is raised slightly above said hopper, whereby said cover readily may be attached to or removed from either upper edge of said hopper selectively by moving said cover in a direction away from and transverse to said one edge thereof when said other edge is raised above the top of said hopper, said stop flange on said securing member being engageable with the downwardly extending flange on the upper edge of the hopper relative to which the cover is pivotally movable when the opposite edge of the cover has moved past the vertical toward open position to limit such opening movement, the angularly extending portion on said member being engageable with the terminal edge of said flange on said upper edge of said hopper to hold said edge of said cover tightly against said upper edge of the hopper when said cover is closed, and latch means on said cover adjacent the opposite edge thereof and movable into and out of engagement with a portion of the upper edge of the side of the hopper opposite that with which said movement-controlling member is in engagement to secure said cover in closed position.

5. A hopper having an upper opening, a cover therefor comprising a lid having a securing part engageable abuttingly with a portion of said hopper projecting inwardly and adjacent one side of said opening by slidable movement of said lid generally parallel to the plane of the upper opening of said hopper to aid in holding said lid in closed position over said opening and preventing upward separative movement of said lid from said hopper, and an extension on said part formed as a hook adapted to engage an edge of said hopper defining one side of said opening to hold said lid on the hopper with the opening exposed.

6. A hopper having an upper opening, a cover therefor comprising a lid having a securing part adjacent one edge engageable abuttingly with a portion of said hopper projecting inwardly and adjacent one side of said opening by slidable movement of said lid generally parallel to the plane of the upper opening of said hopper to aid in holding said edge of said lid in closed position over said opening and preventing upward separative movement of said lid from said hopper, an extension on said part formed as a hook adapted to engage an edge of said hopper defining one side of said opening to hold said lid on the hopper with the opening exposed, and a latch carried by said lid adjacent the opposite edge thereof and engageable with a portion of said hopper adjacent the opposite side of said opening when said lid is in closed position to secure the lid in such position.

References Cited in the file of this patent
UNITED STATES PATENTS

| | | |
|---|---|---|
| 1,842,603 | Gray | Jan. 26, 1932 |
| 2,664,221 | Seltzer | Dec. 29, 1953 |
| 2,680,534 | Penfold | June 8, 1954 |

FOREIGN PATENTS

| | | |
|---|---|---|
| 330,523 | Great Britain | June 10, 1930 |